United States Patent [19]

Liou

[11] 3,862,615

[45] Jan. 28, 1975

[54] APPARATUS FOR CONTROLLING PROGRESS OF A TASK

[76] Inventor: Shu-Lien Liou, No. 195, Chung King North Rd., Taipei, Taiwan

[22] Filed: Nov. 20, 1973

[21] Appl. No.: 417,564

[52] U.S. Cl. ................. 116/135, 35/24 A, 40/19.5, 235/89
[51] Int. Cl. ............................ G06c 3/00, G09f 5/00
[58] Field of Search ......... 40/19.5, 16, 65; 116/135; 235/89; 35/24 A

[56] References Cited
UNITED STATES PATENTS

| | | | |
|---|---|---|---|
| 1,880,089 | 9/1932 | Heidecorn et al. | 116/135 |
| 3,162,174 | 12/1964 | Whyte | 116/135 |
| 2,703,548 | 3/1955 | Mackintosh | 116/135 |
| 2,838,862 | 6/1958 | McConnell | 116/135 |
| 3,680,525 | 3/1972 | Berge | 116/135 |

Primary Examiner—Stephen J. Tomsky
Attorney, Agent, or Firm—Lane, Aitken, Dunner & Ziems

[57] ABSTRACT

An apparatus for controlling the progress of a task defined by at least one task element is disclosed comprising a progress control board which includes at least one task section. Each task section includes a time scale, a plurality of operation step or task element tags positionable relative to the time scale for scheduling the completion of the task element relative to the time scale. A fact card having horizontal row segments corresponding to the task elements of the overall task is also positionable along the time scale and includes a plurality of horizontal row segments for monitoring the completion of each task element. The fact card illustrates the actual progress and the completion of each task element and is used to display indicia representing whether the progress is normal or abnormal, the latter indicating that remedial action may be necessary. By visually comparing the position of the fact card and the position of the task element tag relative to the time scale in comparison to the degree of completion of the task element as seen on the fact card, it can be readily ascertained whether the task is progressing according to schedule. In an alternative embodiment, a pair of task element tags for each task element are used, one indicating the target date for the initiation of the task element, the latter indicating the target date for the completion of the task.

9 Claims, 6 Drawing Figures

FIG. IC

APPARATUS FOR CONTROLLING PROGRESS OF A TASK

BACKGROUND OF THE INVENTION

This invention relates generally to an apparatus for controlling the progress of a task or job. More particularly, this invention relates to an apparatus which provides top rank executives an opportunity to implement the principle of management by exception. Still more particularly, this invention relates to an apparatus which provides at a glance not only the progress of various steps or elements of the task, but also the urgency or progress status of each individual task element so as to draw the overall job status to the attention of management to take the necessary remedial action, if required.

In the art of implementing good management techniques, it is a recurring problem to monitor the progress of the various jobs or tasks which contribute to the performance of an assigned effort. Because management time is limited at least for the purpose of management efficiency, it is an overall aim in such monitoring to obtain input on the status of a task in order to implement readily any corrective actions that need be taken to hurry or coordinate the completion of the task, to take corrective actions, if necessary, and to eliminate unnecessary actions. Accordingly, a number of approaches have been developed to achieve such aims including assigning such monitoring tasks to an individual or corporate group and in developing various graphic means to illustrate the status of completion of various tasks.

Thus, many kinds of control boards have been developed, based upon the so-called "Gantt Chart," which may also be used in the control of the progress of a task having multi-operational steps. Usually, a job schedule and the actual progress of the job are simultaneously shown on the board and the percentage of completion indicated at the end of each individual job or operational step. However, the urgency or status of the present situation in comparison with the schedule cannot be easily reflected in such kinds of boards.

It is therefore one object of the present invention to provide a progress control apparatus which not only shows the job schedule, but also the actual progress of the job to date, a countdown toward a goal, and with the aid of a fact card, a clear indication of the urgency of the situation by color-coded signals.

It is another object of the present invention to provide top management with such an apparatus to eliminate or reduce the time required to leaf through daily reports by checking daily on the signals on the board of the apparatus, whereupon management can take remedial actions based upon the rule of control by exception. The registration on the fact card and filling in of daily progress could be effected by a common clerk who would not need much experience and/or training to perform such a task. The tedious report reading work is thereby shifted from the top rank personnel to a much lesser grade of office personnel, thus increasing the work efficiency of management.

It is still another object of the present invention to provide executive level personnel, and especially top level executive personnel, with a useful tool to enable them to achieve precise control of the progress and to implement their appropriate judgment of the urgency of remedial operations.

BRIEF SUMMARY OF THE INVENTION

The apparatus according to the invention for controlling the progress of the task consisting of at least one task element comprises a progress board which includes at least one task section. Each task section comprises a time scale extending laterally from one edge of the board to the other for indicating the target date for the completion of each task element. The time scale is positioned in the upper middle portion of the task section, with the zero mark of the time scale positioned at the leftmost end thereof.

At least one, or a plurality of operation step or task element tags are attached to the board at the upper portion thereof and are displaceable with respect to the time scale. An edge of each task element tag indicates the date along the time scale which represents the target date for the completion of that task element. A fact card for displaying the progress of each operation step with respect to the task completion is positioned at the lower portion of the time scale and is movable therealong periodically in such a manner that an edge of the fact card represents the current date. In addition to identifying data, the fact card includes a plurality of horizontal sections for illustrating current information related to each operation step or task element. By the use of bars in each horizontal section, the status of preliminary efforts for completing the operation step and the actual status of the completion of the task element may be recorded.

By comparing the today-line position of the fact card relative to the target date for the completion of a task element along the time scale in conjunction with the degree of completion of that task element on the fact card, indicia may be used to indicate that remedial action is necessary. Thus, by way of example, if the position of the fact card indicates that a predetermined period of time has elapsed beyond the target date for the completion of a task element and the bar on the appropriate horizontal row segment on the fact card indicates that the operation step has not been completed, the indicia used will indicate that remedial action is necessary.

The horizontal row segments on the fact card are spaced for the addition of two bars thereon. The first bar indicates the degree of completion of the preparation for the task element (for example, the quantity received from the former step). The second bar depicts the degree of work completion in connection with the subject task element.

In an alternative embodiment, a pair of task element tags are used, one of the tags indicating the target date for the start of the task element, the other indicating the target date for the completion of the task element.

BRIEF DESCRIPTION OF THE DRAWINGS

In the drawings:

FIG. 1 depicts a fragmentary plan view of the general construction of the apparatus of the present invention and also one of the preferred embodiments thereof wherein FIGS. 1A, 1B and 1C show different progress statuses by changing color signals;

FIG. 3 depicts another preferred embodiment wherein an alternative task element of operation step tag and fact card denotion are adopted wherein

DETAILED DESCRIPTION OF THE PREFERRED EMBODIMENTS

Figure 1A:
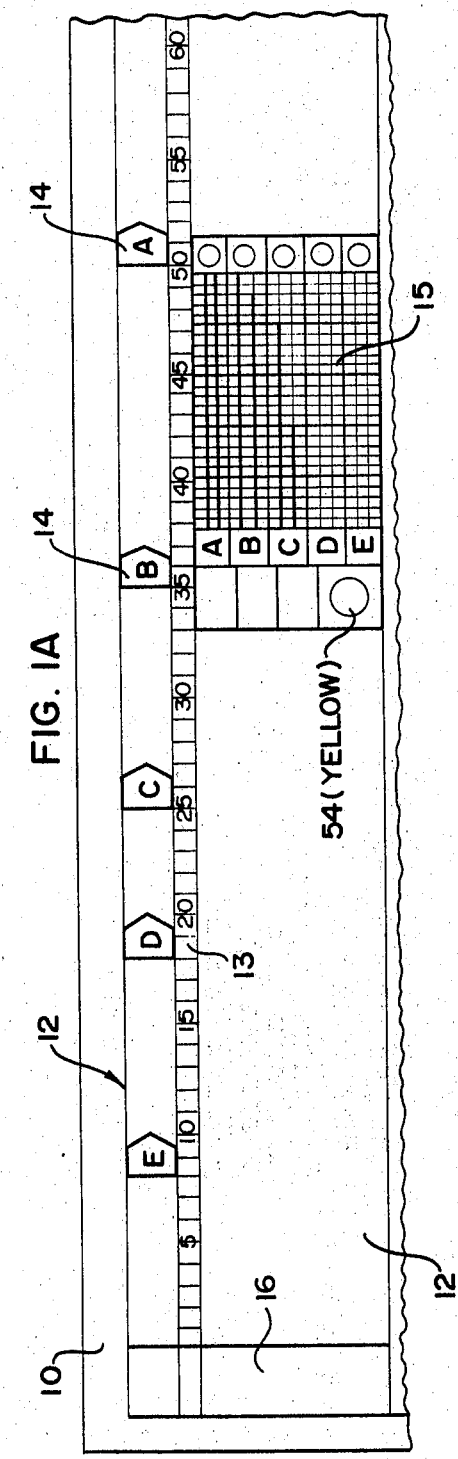

Now referring to FIG. 1, an apparatus according to the present invention, for indicating the progress of the task, comprises an upstanding elongated rectangular display board 10 and as many elementary sections 12 as desired thereon, each of which represents an individual job. A time scale 13 is included in the upper middle portion of each section 12 representing a number of days for the completion of the overall task, without necessarily denoting the actual calendar date. The time scale 13 extends laterally from the left hand portion of the board adjacent to the right hand edge of a time compartment 16 to the right hand portion of the board. The zero portion of the time scale is at the left hand edge of the time scale and the indicia on the time scale increase along the time scale.

Operation step or task element tags 14 are included in the upper portion of each section 12 adjacent to and positionable along the time scale 13. A plurality of tags 14, each bearing distinguishing indicia such as the letters of the alphabet, may be used to illustrate and are displaceable with respect to the time scale. The tags 14 represent each necessary operation step or task element before the overall task is completed.

A fact card 15, the details of which will be discussed later, is located in the lower portion of the section 12 adjacent to and positionable relative to the time scale 13.

The material used for the board 10 may be any kind of sheet or plate material, for example, plywood, aluminum sheet, iron sheet and the like.

The operation step or task element tags 14 and the fact card 15 may be secured to the board 10 by a number of suitable techniques. For example, the tags 14 and the card 15 may be hung or slidably mounted on rails on the board 12 or magnetically suspended when the base plate is made of iron sheet.

The time scale 13 preferably has its leftmost end as zero and contains indicia counting upwardly toward the right hand end of the scale. In this embodiment, a single tag 14 is used for each individual task or operation step. The flat front end of the tags 14 is to be considered as representing the deadline or scheduled completion of that particular task step and is placed adjacent to the appropriately corresponding time scale 13. For example, the tag 14 particularly designated by the letter "E" is set at the eighth day and the tag designated by the letter "D" is set at the 18th day and the like. The fact card 15, with its left edge denoting "today," therefore should be moved daily or periodically by the control clerk to keep it up to date. As shown, the fact card 15 is at the 33rd day.

The time compartment 16 and the task identifying space scale 13 may be printed in a daily, weekly, or monthly scale as desired. The zero means the deadline of the whole job and is set as a goal of completion. Thus, the fact card 15 is preferably moved from right to left along the time scale. Accordingly, the task to be first completed is noted by the task element tag 14 with the letter "A" and so forth.

Each section 12 includes a progress display member or fact card 15 for displaying the progress of the, or each, task element required to be completed in respect to the overall task. The card 15 is attachable to the board 10 in a manner similar to the attachment of the tags 14 and is movable longitudinally, in a direction parallel with the time scale 13 so as to be immediately adjacent the lower edge thereof.

Figure 2:
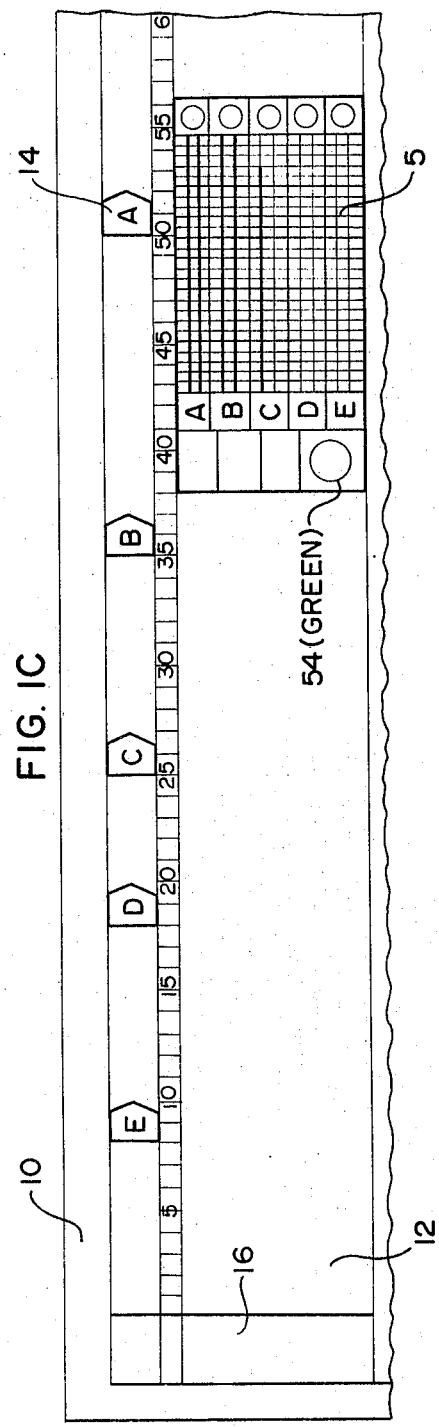
FIG. 2 shows a plan view of the details of the fact card used in conjunction with the apparatus of FIG. 1.
Figure 2:
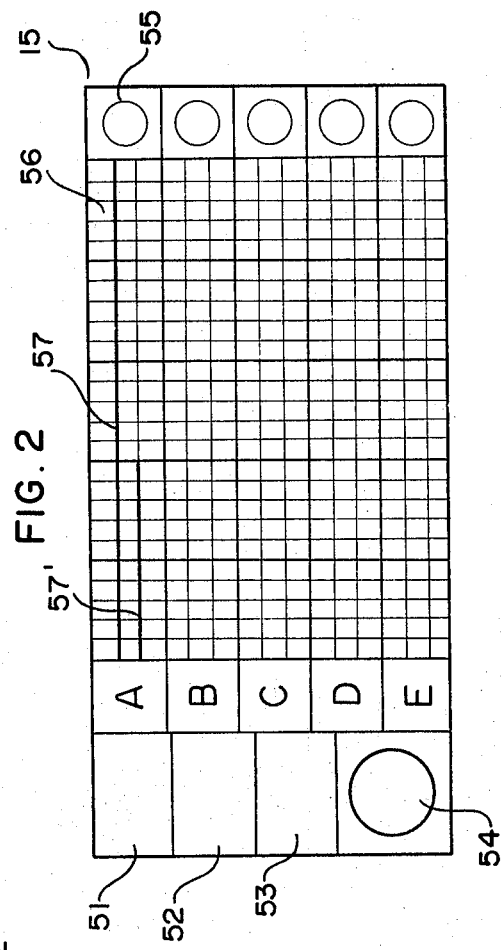

Referring to FIG. 2, the left hand edge portion of the card 15 includes margin blocks respectively designated by the numerals 51, 52 and 53. The block 51, for instance, may represent the registration of the job number; the block 52 may represent the commodity code; and the block 53 may represent the quantity of order, and the like. A number of such margin blocks may be used in accordance with the quantity of data which should be displayed on the fact card with respect to the task. An indicating element 54, for example, a circle, is used for the placing of a color signal to show the situation of urgency or the progress status of the whole job. For example, green may be used for the actual progress being ahead of schedule, yellow for normal, and red for delay. The card 15 includes a plurality of divided horizontal row segments A, B, C, D, and E, for example, which correspond to the mark on the operation step tags A, B, C, D, and E. For example, in a knitting wear plan, the steps may be:

A = procurement of material;
B = knitting;
C = sewing;
D = embroidering; and
E = finishing.

Thus, the number of divided horizontal row segments on the fact card 15 is equal to the number of tags 14 and corresponds in meaning thereto. In addition, the horizontal row segments may be further subdivided into a plurality of horizontal subsegments. As shown, each segment is divided into three subsegments to accommodate two bar indicia thereon.

At the right hand end of each of the row segments or operation steps A through E, a circle 55 is placed to provide a red signal when the quality of this said step could not meet the requirement or specification of the task element. A scale 56 crosses these operation row steps and may represent quantity or percentage of the job. The scale 56, when fully entered, should represent 100 percent or the total quantity, since row A, in the example, denotes procurement of material. The scale 56 is so printed or selected to meet the aforesaid purpose. When used quantitatively, in case the scale would not be exactly proportional to the quantity, a vertical bar may be drawn on the scale to denote the selected line to call attention to the need for action or the possibility of inaction for the particular task element. To each operation step, bars 57, 57' are drawn in green and red respectively to indicate the actual progress of the task element. The bar 57 represents the preparation or the acceptance of the foregoing step, while the bar 57' represents the job completion in the said step. For example, in the procurement step, the bar 57 depicts the order placed especially in the case of partial orders, which fact would be clearly reflected, while the bar 57' depicts the material received. Similarly, in the production step, the bar 57 represents material (raw or semifinished) as received from the foregoing step, while the bar 57' represents the work completion in this step.

Figure 1B:
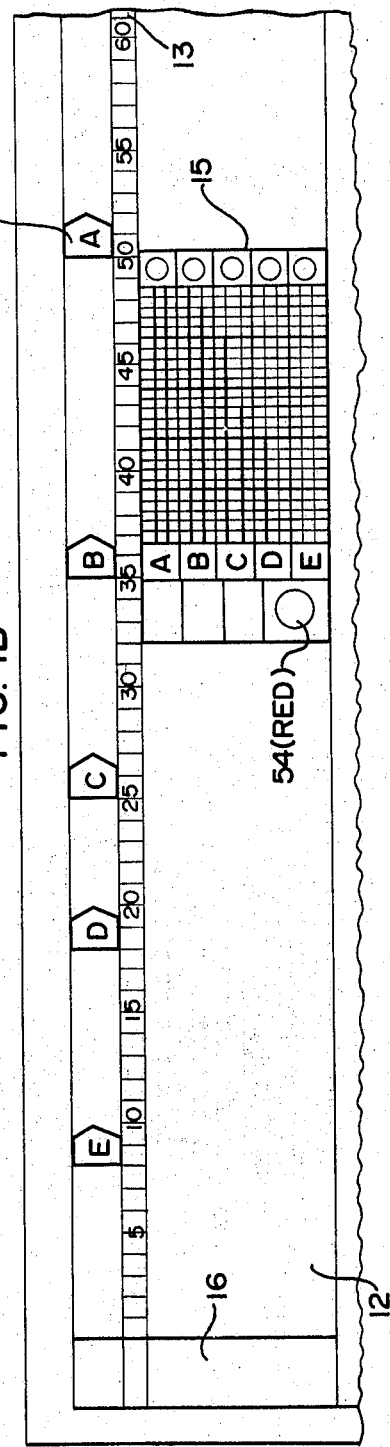

FIGS. 1A to 1C illustrate the different progress statuses by changing color signals of the preferred embodiment of the present invention. The operation step or task element tag 14, adopted in this embodiment, is of a single piece arrowshaped tag, with its flat line facing left. Only the deadline or scheduled completion date is shown by the tag, without the starting line of the said step.

In FIG. 1A, the overall status signal 54 shows, for example, yellow, which represents normal, indicating that no extraordinary remedial action should be taken. In this case, the "today" line, or the front margin of the fact card 15 has passed the deadline set up by the tag B for 2 days. In this instance, it is to be understood that there is a 2-day allowance for each step of the operation. Therefore, even though the "today" line has exceeded the tag B for two days, the overall progress of the job could still be considered normal. A very small portion of the operation step B remains to be completed, as shown by the lower bar in the "B" row segment of the fact card.

In FIG. 1B, the "today" line has exceeded the front edge of the tag B for three days, that is, an additional day has elapsed, with no further progress made in operation "B." Accordingly, the overall status of the task is shown in red to give a necessary warning that the situation requires that remedial action be taken. Thus, the system is able to implement the principle of management by exception, that is, by providing a warning that a decision is necessary when the task progress is falling behind the schedule.

In FIG. 1C, the overall status signal 54 shows green indicating that job progress is ahead of schedule, or in other words, a waste may also exist. According to the tagged schedule or the preset date line, the completion date of step B has not yet been reached. However, from the record of the fact card 15, step "B" has already been completed, as noted by the bars in the row segment labeled "B" on the fact card 15, and most of the part of the finished product from step "B" has been transferred into step "C," as noted by the bar in the row segment labeled "C" on the fact card 15, thus making the overall achievement of the job well ahead of the planned schedule.

Figure 3A:
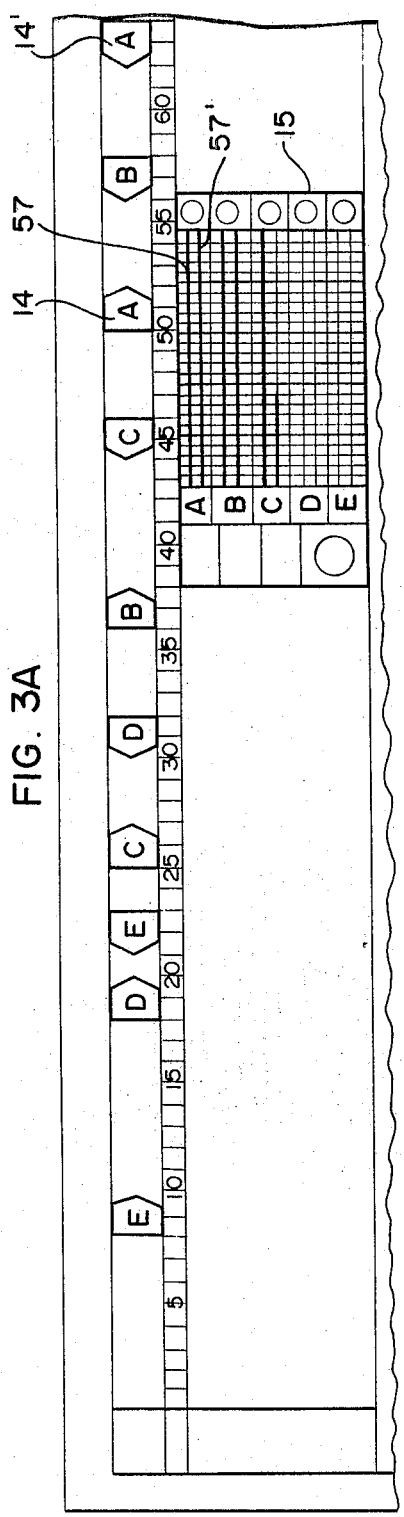
FIGS. 3A and 3B show different progress statuses.
Figure 3B:
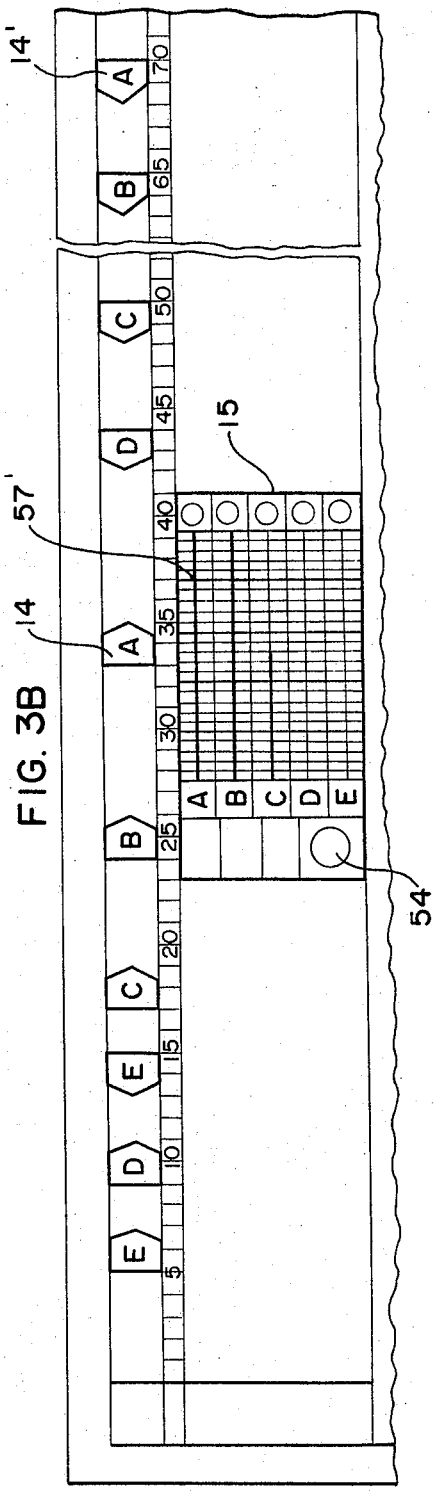

FIGS. 3A and 3B illustrate another preferred embodiment wherein pairs of operation tags 14-14' (A—A, B—B, C—C, D—D and E—E) are adopted to show not only the deadline or expected completion of each operation step, but also when to start. It is also shown that these steps are overlapped, i.e., the starting date for the task element "B" is before the termination date for the task element "A," and so forth.

In FIG. 3A, the fact card uses bars 57 and 57', drawn in green and red respectively, in the manner previously discussed. On the other hand, in FIG. 3B the fact card utilizes only bar 57' representing the completion of each step of operation, omitting the use of the bar 57 (because of the sufficient supply of material in each step of operation).

The applications of the present invention are numerous where the actual progress needs to be reflected against the preset schedule.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. An apparatus for controlling the progress of a task which consists of one or more task elements, said apparatus comprising a progress control board which includes at least one task section, said task section comprising:

A time scale extending laterally across said task section containing indicia related to time, at least one of the indicia being representative of a target date for the completion of the task, and other indicia indicating times intermediate the start and the completion of the task for correlation with each task element;

a task element tag representing each task element which is an operational step pertaining to the completion of the task, said tag being attachable to said task section at a first portion of said progress control board, a portion of said tag including, when related to said time scale, a target date for the completion of a corresponding task element before the completion of the overall task; and a fact card located at a portion of said task section relative to said time scale different from said first portion thereof for displaying the progress of each task element with respect to completion of the task, said fact card being capable of being moved periodically relative to said time scale and having a portion thereof which, when related to said time scale, indicates a current date, said fact card including;

segments which correspond to each of said task elements, each segment receiving indicia indicating the degree of completion of said task element associated with the particular segment, and means for receiving indicia for indicating the urgency of remedial action, said indicia being selected as a result of a visual comparison of the current-date position of the fact card and the position of a particular task element tag relative to the time scale in comparison to the completion or not of the particular task element as indicated on an associated segment on the fact card, said signaling indicia indicating whether the task element is normal, ahead of, or behind schedule.

2. The apparatus according to claim 1 wherein each of said task element tags is a single member structurally adapted to show the deadline for each task element when related to said time scale.

3. The apparatus according to claim 1 wherein a pair of task element tags are utilized for each task element, one of said tags being used to indicate the starting date for each task element, the other being used to indicate the target completion date for each task element.

4. The apparatus according to claim 1 wherein the indicia applied to the fact card to show the urgency of the scheduling are color coded.

5. The apparatus according to claim 1 wherein the fact card includes a portion for receiving indicia representing data relative to the task.

6. The apparatus according to claim 1 wherein the fact card includes scaled spaces in said segment for recording actual progress on either a quantity or percentage basis.

7. The apparatus according to claim 1 wherein each section is structurally adapted to receive two bar indicia thereon, one showing the quantity received or percentage of completion of the task element based either upon steps preparatory to completion of the element or related to the completion of a former task element, the second bar showing the degree of completion of the subject task element.

8. The apparatus according to claim 1 wherein said time scale extends laterally from the left hand edge to the right hand edge of the progress board and has its zero mark coincident with the left hand edge of the task section, indicia on the time scale being graduated upwardly toward the right hand portion of said board.

9. The apparatus of claim 1 wherein said progress control board includes a plurality of task sections.

* * * * *